United States Patent [19]

Christensen

[11] 4,349,043
[45] Sep. 14, 1982

[54] METHOD AND APPARATUS FOR PREVENTION OF OVER-PRESSURIZATION OF A PRESSURE RESPONSIVE DEVICE

[75] Inventor: Bruce D. Christensen, New Orleans, La.

[73] Assignee: Baker CAC, Inc., Belle Chasse, La.

[21] Appl. No.: 156,980

[22] Filed: Jun. 6, 1980

[51] Int. Cl.³ .............................................. F16K 17/04
[52] U.S. Cl. ................................ 137/505.42; 137/517; 166/319
[58] Field of Search .............. 137/517, 505.13, 505.42, 137/DIG. 2; 166/319

[56] References Cited

U.S. PATENT DOCUMENTS

| | | | |
|---|---|---|---|
| 1,003,916 | 9/1911 | Koenig | 137/505.42 |
| 1,832,863 | 11/1931 | Hewitt | 137/505.42 |
| 2,219,736 | 10/1940 | Bryant | 137/517 X |
| 2,541,282 | 2/1951 | Powers | 137/517 X |
| 2,704,551 | 3/1955 | Ralston | 137/505.44 X |
| 3,543,793 | 12/1970 | Dollison | 137/517 X |
| 4,087,986 | 5/1978 | Grahl | 137/517 X |

Primary Examiner—William R. Cline
Attorney, Agent, or Firm—William C. Norvell, Jr.

[57] ABSTRACT

An apparatus and method are provided in which the apparatus is insertable along a pressure transmission conduit extending from a source point to a pressure responsive device, such as a safety valve in a subterranean well. The apparatus has a fluid passageway through a housing with inlet and outlet means for communicating the passageway to the transmission conduit. A frictionless ball valve head and seat means are disposed in the housing and across the passageway for selectively isolating pressure communication between members of the transmission conduit. Means, such as a plunger, are provided for shifting the ball valve head off of its seat, with piston means being carried by the plunger and including a piston head which is responsive to differential pressure for urging the plunger in a first direction to move the ball valve to its seat upon increase of pressure in the conduit above a predetermined value. Biasing means shift the ball valve away from its seat when pressure within the transmission conduit does not exceed a predetermined value, for normal operation of the pressure responsive device.

1 Claim, 2 Drawing Figures

METHOD AND APPARATUS FOR PREVENTION OF OVER-PRESSURIZATION OF A PRESSURE RESPONSIVE DEVICE

BACKGROUND OF THE INVENTION

1. Field of the Invention

The present invention relates to an apparatus insertable on a fluid transmission conduit between a source point and a pressure responsive device to prevent over-pressurization of the pressure responsive device when pressure within the transmission conduit exceeds a predetermined value.

2. Description of the Prior Art

In order to prevent over-pressurization of pressure responsive devices, such as relay valves, safety valves, devices containing sensitive diaphragms, and the like, a relief means typically is incorporated within the pressure responsive device, or, alternatively, along the fluid pressure transmission conduit for relieving pressure in excess of a predetermined value in order to prevent damage from occuring to sensitive components in the pressure responsive device, such as elastomer seals, valve seats, and the like, as a result of exposure to pressures in excess of the tolerable operation range for the pressure responsive device. Typically, such prior art devices prevent such over-pressurization of the pressure responsive device by venting excess pressure within the pressure transmission conduit to atmosphere. Such an approach is disadvantageous because, particularly in the case of hydraulic pressure responsive devices, such venting will have a negative environmental impact.

Moreover, many prior art devices have provided a vent on the fluid pressure transmission conduit to prevent over-pressuring of the pressure responsive device by utilization of a piston or spool-like device, which either carries or receives elastomeric seals which, after repeated use, may have reduced pressure sensing integrity because of frictional wear on the seal face.

The present invention provides a method and apparatus for prevention of over-pressurization of a pressure responsive device by providing a frictionless ball valve head which is selectively shiftable to sealing engagement upon a companion seat therefor. Because of the essentially frictionless contact of the ball relative to its seat, no friction wear will result upon the outer surface of the ball element, resulting in a considerable extension of life when compared to typical elastomer sealing elements utilized on pistons and spools in prior art devices. Moreover, the present device is automatically resettable and does not require mechanical resetting subsequent to being placed in its pressure isolating mode.

SUMMARY OF THE INVENTION

The present invention provides an automatically resettable apparatus which is insertable along a pressure transmission conduit having members which extend from a source point to a pressure responsive device. The apparatus comprises a housing having a fluid passageway with inlet means on the housing for communicating the conduit member from the source point with the passageway. Outlet means on the housing are provided for communicating the conduit member from the pressure responsive device with the passageway. A frictionless ball valve head and seat means are disposed in the housing and across the fluid passageway for selectively isolating pressure communication between the conduit members. A plunger shifts the ball valve head off of its seat, and piston means are carried by the plunger and include a piston head which is responsive to differential pressure for urging the plunger in a first direction to move the ball valve to the seat upon increase of pressure in the conduit member from the source point above a predetermined value. Biasing means shift the ball valve head away from its seat when pressure within the conduit member from the source point does not exceed a predetermined value.

DESCRIPTION OF THE PREFERRED EMBODIMENTS

Figure 1:
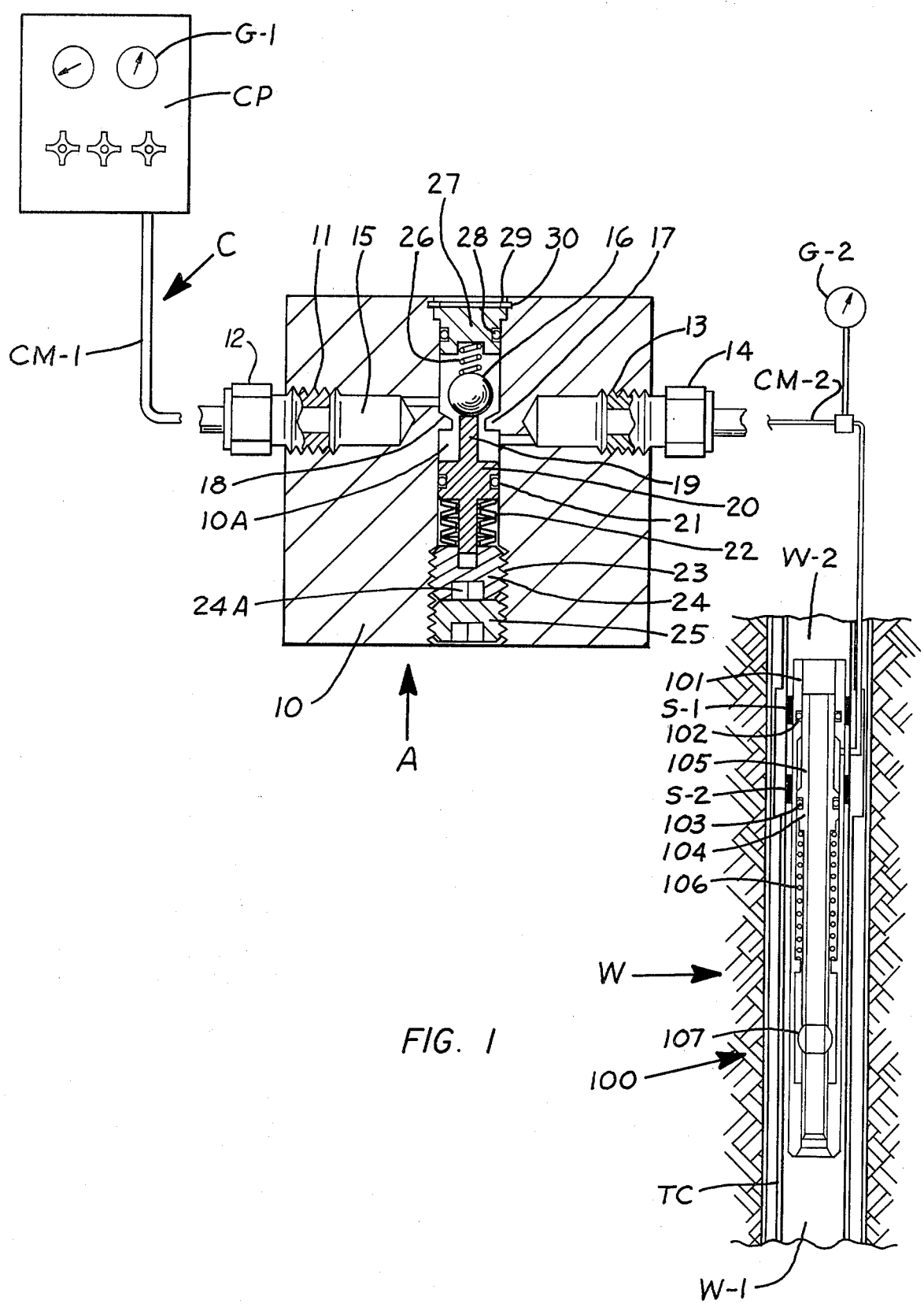
FIG. 1 is a schematic illustration of a pressure transmission conduit extending from a control panel to a safety valve within a subterranean well, the over-pressurization apparatus of the invention being shown in detailed cross-sectioned view on the conduit, and shown in position for normal communication of fluid pressure from the control panel to the safety valve.

Now referring to FIG. 1, the apparatus A is shown inserted along a pressure transmission conduit C having a conduit member CM-1 in fluid communication with a source of fluid pressure within a control panel CP having a pressure gauge G-1 which senses and reflects the pressure within the conduit member CM-1. One end of the conduit member CM-1 is affixed to the control panel CP and the other end of the member CM-1 is received within the apparatus A by means of an inlet plug 12 received through threads 11 of the apparatus A. The pressure transmission conduit continues downstream of the apparatus A by means of conduit member 2 secured through outlet plug 14 by means of the threads 13 on the apparatus A. The conduit member CM-2 extends to a pressure responsive device, such as the safety valve 100 shown in FIG. 1. A gauge G-2 on the conduit member CM-2 senses and reflects, quantitatively, the pressure within the conduit member CM-2 downstream of the apparatus A.

A typical pressure responsive device for use in conjunction with the apparatus A is illustrated in the Figs. as a safety valve 100. However, it should be understood that the apparatus A may be utilized with any number of pressure responsive devices, such as other types of valves, gauges, and the like.

As illustrated, the safety valve 100 is disposed interiorly of a well W and interior of a tubular conduit, such as casing or a production string. Seals S-1 and S-2 sealingly engage the safety valve 100 to the interior wall of the tubular conduit TC. Additionally, the safety valve 100 may be anchored in the well W by utilization of nipples, latches, or other conventional means. The safety valve 100 selectively isolates fluid flow from the lower part of the well bore W-1 below the safety valve 100 to the upper part of the well bore W-2 thereabove, and extending to the top surface of the well W. A longitudinally extending actuator mechanism 105 is implaced within the housing 101 of the safety valve 100 and shifts longitudinally in response to application of pressure above a piston head 104 and between seals 102 and 103, the pressure being carried through the fluid transmission conduit and directly to the safety valve 100 by means of the conduit member CM-2. When designed in a "fail safe" mode, the safety valve 100 has a ball element 107 which is reciprocable between fully opened to fully closed position upon intentional or inadvertant decrease in fluid pressure within the line CM-2. An increase in pressure within the line CM-1 will act upon the piston head 104 to shift the actuator 105 longitudinally downwardly to compress a spring 106 and manipulate the ball 107 to the fully open position. The spring 106 stores energy necessary to shift the actuator 105 upwardly as pressure within the line CM-2 is withdrawn for enabling manipulation of the ball 107 to the fully closed position.

A fluid passageway 15 is defined within the housing 10 of the apparatus A and extends between the inlet and outlet plugs 12 and 14, respectively. A frictionless ball valve head 16 is disposed within the passageway 15 above a profiled seat 17 having a ball sealing surface 18 facing the ball 16. When fluid pressure within the transmission conduit is within the normal operating range, the ball 16 is held off of the seat 17 and away from the seal surface 18 by means of a plunger 19 contacting the outer surface of the ball 16 and shifting it in disengaged position relative to the seat 17. The plunger 19 is secured or affixed, or can be made a part of a piston element 20 having an elastomeric ring element 21 circumferentially extending around its exterior for riding along a smooth piston chamber wall 10A. A compressible series of belleville washers or springs 22 are carried below the piston head 20 and have one end resting against the lower face of the piston head 20, and another end resting against the upper face of an adjustment screw 24 received through the housing 10 on adjusting threads 23. Rotational manipulation of the adjuster 24 along the threads 23 will control the compressive force or stored energy containable within the biasing means, or belleville springs 22 by inserting a setting means, such as a hex wrench, within the setting bore 24A. A set nut 25 also is received on the threads 23 and is affixed within the housing 10 subsequent to proper adjustment of the adjuster 24.

The ball 16 receives on one side thereof away from the plunger 19 a compressible spring element 26 which may be provided to guide or urge, somewhat, the ball 16 to the seat 17 as the plunger 19 is moved away from the ball 16. However, in some applications, the housing 10 may be positioned such that the ball 16 simply will gravitate to the seat 17, thus enabling elimination of use of the spring 26. The spring 26 is secured within a profile on a spring retainer 27 having an O-ring 28 to prevent fluid communication between the retainer 27 and the housing 10, the retainer 27 being implaced within the housing 10 interiorly of a snap ring 29 received within a groove 30 on the housing 10.

OPERATION

Figure 2:
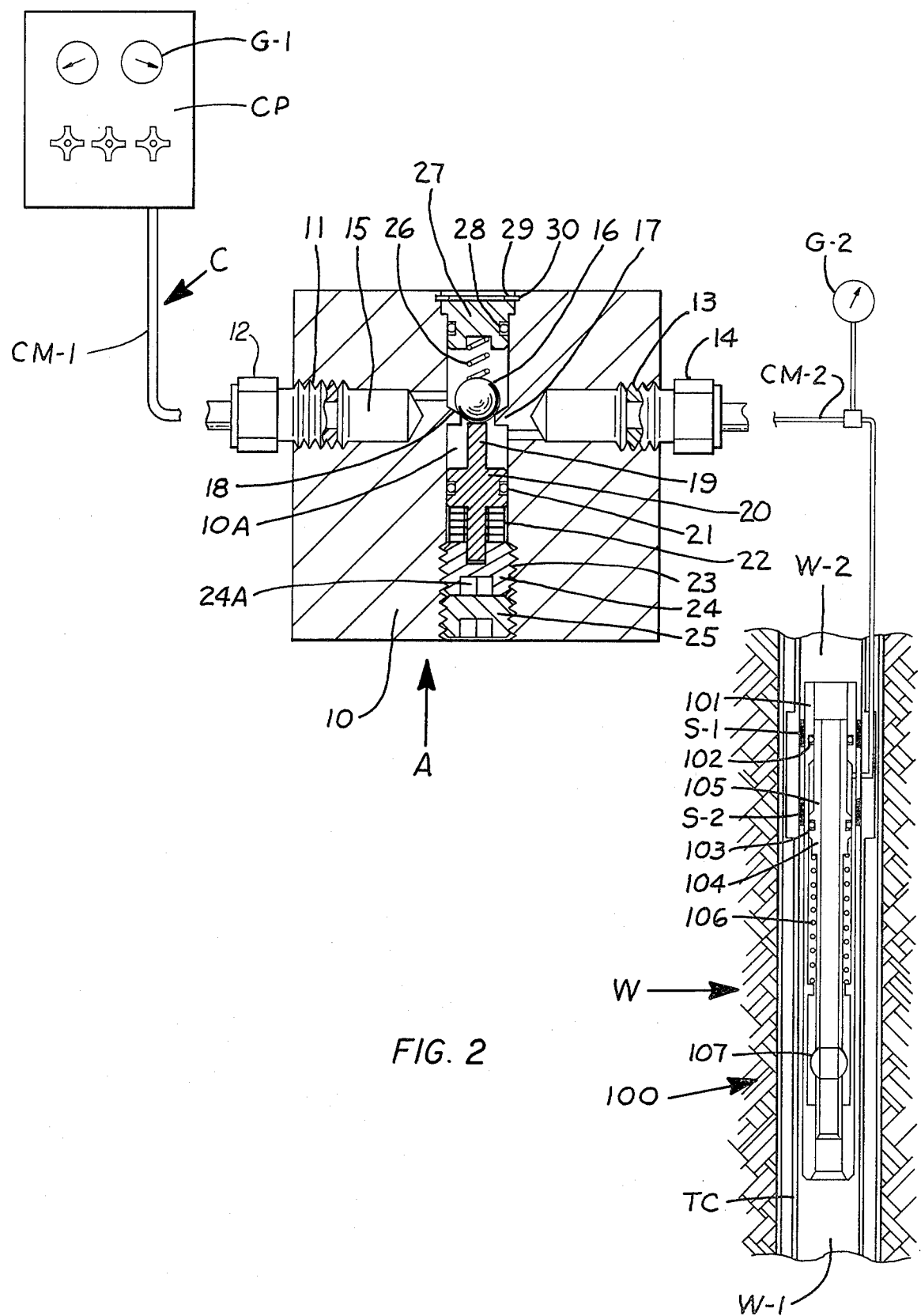
FIG. 2 is a view similar to that shown in FIG. 1, illustrating the movement of the component parts of the apparatus when pressure within the fluid pressure transmission conduit is in excess of a predetermined value for prevention of fluid pressure communication in excess thereof to the safety valve.

During normal operation, the pressure responsive device will receive pressure delivered from the control panel CP through the pressure transmission conduit members CM-1 and CM-2 and the readings on the gauges G-1 and G-2 will be substantially identical. Because the ball 16 is held off of its seal surface 18 by means of the piston 20 being urged upwardly by means of the force defined through the belleville springs 22, fluid pressure is transmitted from the conduit member CM-1 to the conduit member CM-2 by means of the passageway 15 in the apparatus A. The ball 16 will be held in such a position, shown in FIG. 1, until such time as pressure upstream of the apparatus A and within the conduit member CM-1 exceeds a predetermined value. When the normal operation range of pressure is exceeded, differential pressure will be defined across the piston 20 at the elastomer seal 21 and, because of the adjustment through the adjuster 24 of the force defined through the springs 22 on the piston 20, this stored energy or force will be overcome by the differential pressure exerted across the ring 21 and on the piston head 20, thus directing the plunger 19 in one direction away from the ball 16, enabling the ball 16 to become sealingly engaged upon the surface 18 of the seat 17. Now, the increased fluid pressure delivered through the conduit member CM-1 is prevented from completely passing through the apparatus A within the passageway 15 to the conduit member CM-2 downstream of the apparatus A and to the pressure responsive device, i.e., the safety valve 100. The apparatus is in the position as shown in FIG. 2. Note that the gauge G-2 on the transmission conduit member CM-2 downstream of the apparatus A is in substantially the same position as shown in FIG. 1, and reflecting that the pressure within the line CM-2 is still within normal operating range. However, the gauge G-1 on the control panel CP reflects an increase in fluid pressure within the conduit member CM-1.

If and when fluid pressure within the conduit member CM-1 upstream of the apparatus A falls to within the normal operating range and below a predetermined value, differential pressure will be defined across the ball 16, and it will move slightly away from its seal surface 18. As the ball 16 becomes sealingly removed from the seal surface 18, the energy stored through the belleville springs 22 will overcome fluid pressure acting upon the piston head 20 and will act upon the piston head 20 to move the plunger 19 toward the ball 16 and maintain it off of the seal surface 18 such that fluid pressure communicates through the passageway 15 between the conduit members CM-1 and CM-2. The apparatus now is again in the position shown in FIG. 1, and has been automatically reset for detection of pressure in excess of a predetermined value.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A subterranean well flow control device having a valve head selectively movable into sealing engagement on a valve seat for prevention of transmission of well fluids therethrough from at least one production zone within the well to the top of the well, said valve head being shiftable to one position by control fluid pressure in excess of a first predetermined value, said valve head and seat including elastomeric seal elements exposed to the control fluid pressure, a control line transmission conduit for said control fluid pressure extending from said well flow control device to the top surface of the well and thence to a source of fluid pressure, a pressure isolation device connected in series in said control line transmission conduit, said pressure isolation device comprising a housing, a fluid passageway through said housing, means on opposite ends of said fluid passageway for connecting said fluid passageway in series with said control line transmission conduit, an annular substantially friction free valve seat disposed in transverse relationship to said fluid passageway, a ball co-operable with said annular valve seat for selectively interrupting fluid flow through said fluid passageway, resilient means urging said ball onto said annular valve seat, plunger means normally holding said ball off of said annular valve seat, piston means carried by said plunger means and responsive to fluid pressure in the inlet side of said fluid passageway for urging said plunger in a direction to permit said ball to move into engagement with said annular valve seat upon increase of pressure in said fluid passageway above a second predetermined value higher than said first predetermined value but not harmful to said elastomeric seal elements, and biasing means for shifting said ball away from said annular valve seat when fluid pressure within said fluid passageway does not exceed said second predetermined value, thereby preventing the application of excessive control fluid pressure to said subterranean well flow control device.

* * * * *